US007869414B2

(12) United States Patent
Isokangas et al.

(10) Patent No.: US 7,869,414 B2
(45) Date of Patent: Jan. 11, 2011

(54) METHOD FOR MULTIPLEXING DATA STREAMS ONTO A TRANSPORT BEARER BETWEEN AN ORIGINATING NETWORK NODE AND A RECEIVING NETWORK NODE

(76) Inventors: Jari Isokangas, Kelohongankatu 1 B 4, FIN-33820 Tampere (FI); Sinikka Sarkkinen, Kisällinkuja 5, FIN-36200 Kangasala (FI); Sami Kekki, Ruusulankatu 8 A 1, FIN-00260 Helsinki (FI); Woonhee Hwang, Juhanintie 6 A, FIN-02180 Espoo (FI)

( * ) Notice: Subject to any disclaimer, the term of this patent is extended or adjusted under 35 U.S.C. 154(b) by 1173 days.

(21) Appl. No.: 10/849,892

(22) Filed: May 21, 2004

(65) Prior Publication Data

US 2004/0213297 A1    Oct. 28, 2004

Related U.S. Application Data

(63) Continuation of application No. PCT/FI01/01012, filed on Nov. 21, 2001.

(51) Int. Cl.
*H04W 4/00* (2009.01)
(52) U.S. Cl. ................... 370/341; 370/535; 370/538; 455/452; 455/63
(58) Field of Classification Search ......... 370/328–331, 370/535–538, 338, 468, 348, 437, 352, 353, 370/341; 455/452, 63, 418, 419
See application file for complete search history.

(56) References Cited

U.S. PATENT DOCUMENTS

| 4,602,367 | A | 7/1986 | McDermott, III |
| 5,299,198 | A | 3/1994 | Kay et al. |
| 6,178,175 | B1 | 1/2001 | Zumkeller |
| 6,331,989 | B1* | 12/2001 | Tezuka ........................ 370/535 |
| 6,374,112 | B1* | 4/2002 | Widegren et al. ......... 455/452.2 |
| 6,901,060 | B1* | 5/2005 | Lintulampi .................. 370/329 |
| 6,941,132 | B2* | 9/2005 | Van Lieshout et al. ....... 455/418 |
| 7,343,161 | B2* | 3/2008 | Shin ............................ 455/445 |
| 7,366,155 | B1* | 4/2008 | Leppisaari et al. ........... 370/348 |

* cited by examiner

*Primary Examiner*—Huy D Vu
*Assistant Examiner*—Dady Chery (57) ABSTRACT

The area of the invention belongs to the transport technologies in UTRAN. This invention concerns a method for multiplexing a data stream onto a transport bearer between an originating network node and a receiving network node in a telecommunications network. This is done in order to ensure the effective usage of transport resources over the two interfaces, i.e. Iub/Iur. To accomplish this the RNC and/or Node B/RNC should check if the there already exists a transport bearer, which can be utilized for HS-DSCH transport over Iub/Iur interface. Because of this a transport bearer identification code or transport bearer id is needed to identify this bearer between RNC and Node B/RNC.

46 Claims, 7 Drawing Sheets

METHOD FOR MULTIPLEXING DATA STREAMS ONTO A TRANSPORT BEARER BETWEEN AN ORIGINATING NETWORK NODE AND A RECEIVING NETWORK NODE

This is a Continuation of International Application No. PCT/FI01/01012 filed Nov. 21, 2001, which designated the U.S. and was published under PCT Article 21(2) in English.

FIELD OF THE INVENTION

The present invention relates to telecommunication systems. In particular, the present invention relates to a novel and improved method for multiplexing data streams onto a transport bearer between an originating network node and a receiving network node.

BACKGROUND OF THE INVENTION

Figure 1:
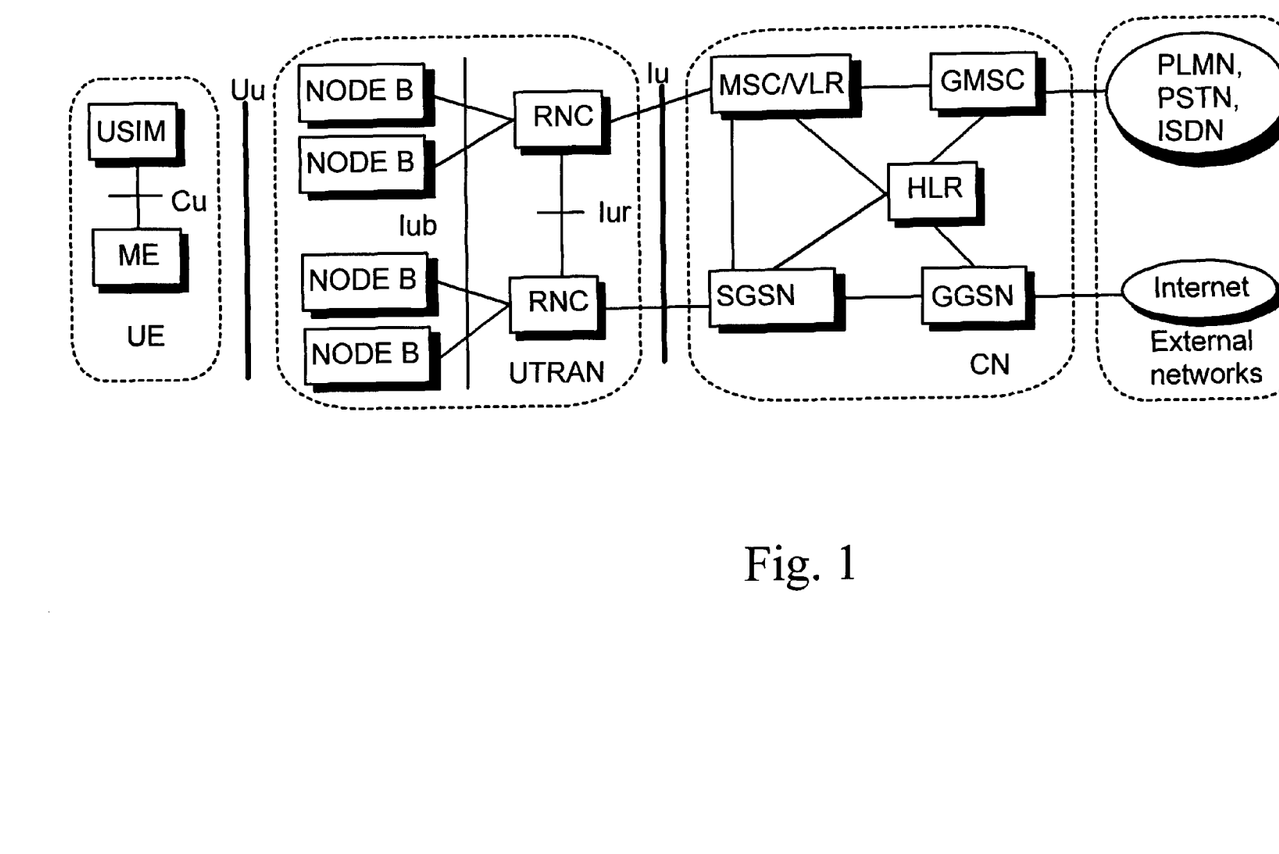
FIG. 1 is a block diagram illustrating an example of the state of the art scenario relating to the present mobile network.

In the current specifications of the third generation mobile networks (referred to as UMTS, Universal Mobile Telecommunication System), the system utilises the same well-known architecture that has been used by all main second generation systems. A block diagram of the system architecture of the current UMTS network is presented in FIG. 1. The UMTS network architecture includes the core network (CN), the UMTS terrestrial radio access network (UTRAN), and the user equipment (UE). The core network is further connected to the external networks, i.e. the Internet, PSTN (Public Switched Telephone Network) and/or ISDN (Integrated Digital Services Network).

The UTRAN architecture consists of several radio network subsystems (RNS). The RNS is further divided into the radio network controller (RNC) and several base stations (BTS, referred to as Node B in the 3 GPP specifications). In this architecture there are several different connections between the network elements. The Iu interface connects CN to UTRAN. The Iur interface enables the exchange of signalling information and user plane information between two RNCs. There is no equivalent interface to Iur in the architectures of the second generation mobile networks. The radio network layer (RNL) signalling protocol across the Iur interface is called the radio network subsystem application part (RNSAP). The RNSAP is terminated at both ends of the Iur interface by an RNC. The Iub interface connects an RNC and a Node B. The Iub interface allows the RNC to indicate the required radio resources to the Node, for example, to add and delete cells controlled by Node B to support communication of dedicated connection between UE and C-RNC(Control RNC), information used to control the broadcast and paging channels, and information to be transported on the broadcast and paging channels. One Node B can serve one or multiple cells. UE is connected to Node B through the Uu radio interface. UE further consists of a subscriber identity module (USIM) and mobile equipment (ME). They are connected by the Cu interface. Connections to external networks are made through Gateway MSC (Mobile Services Switching centre) (towards circuit switched networks) or GGSN [Gateway GPRS (Group Packet Radio System) Support Node] (towards packet switched networks).

Figure 2:
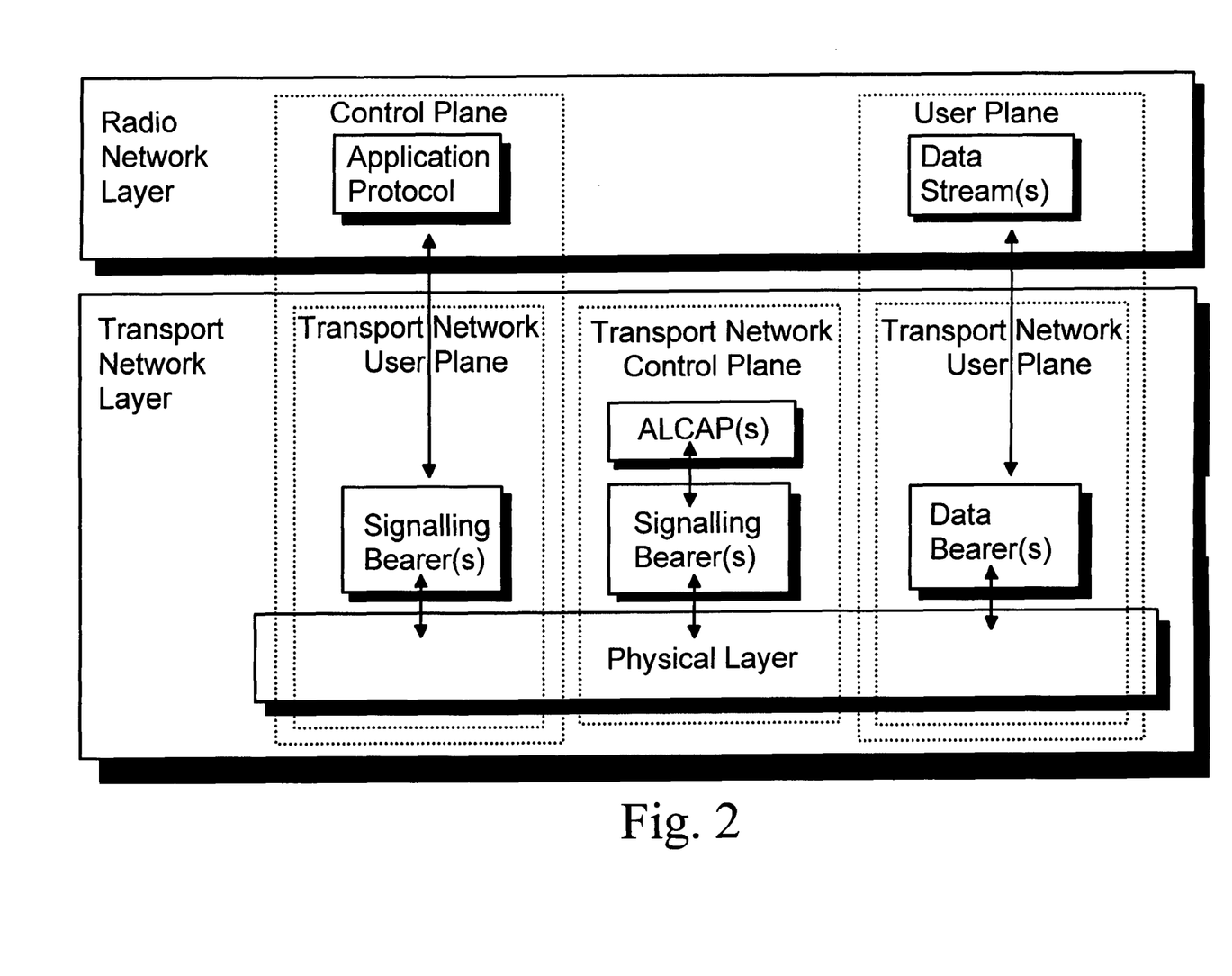
FIG. 2 is a general protocol model for UTRAN interfaces of FIG. 1.

The general protocol model for UTRAN Interfaces is depicted in FIG. 2, and described in detail in the following. The structure described is based on the principle that the layers and planes are logically independent of each other.

The Protocol Structure consists of two main layers, Radio Network Layer and Transport Network Layer (TNL). These are presented in the horizontal planes of FIG. 2. All UTRAN related issues are visible only in the Radio Network Layer, and the Transport Network Layer represents the standard transport technology that is selected to be used for UTRAN. UTRAN has certain specific requirements for TNL. For instance, the real time requirement, i.e. the transmission delay has to be controlled and kept small.

Figure 3:
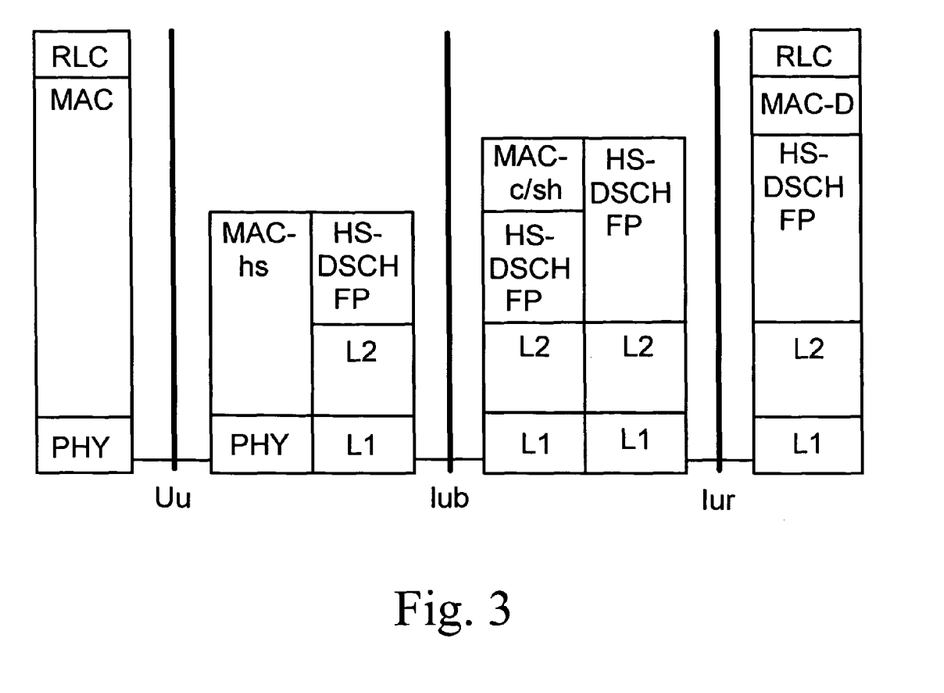
FIG. 3 describes a radio interface protocol architecture of HDSPA.

In the HS-DSCH (HS-DSCH, High Speed Downlink Shared Channel; HSDPA High Speed Downlink Packet Access) specification work the basic assumption is that the same transport solution that has been used for DSCH will be used for HS-DSCH also. In this application the term HS-DSCH is used to describe the channel or data stream between CRNC and Node B on Iub interface and therefore it should not mixed up with the HSDPA related transport channel, which is an internal channel between MAC-hs (Medium Access Control) and L1(Layer1) in Node B. In this solution dedicated transport bearer is reserved separately for each DSCH data stream between SRNC (Serving RNC) and Node B. FIG. 3 shows the radio interface protocol architecture with termination points. In logical model MAC-hs, which is inserted in Node B, locates below MAC-c/sh, which further is implemented in CRNC. The HS-DSCH FP (frame protocol) will handle the data transport from SRNC to CRNC (if the Iur interface is involved) and between CRNC and the Node B. The architecture supports both FDD (Frequency Division Duplex) and TDD (Time Division Duplex) modes of operation, though in the case of TDD, some details of the associated signalling for HS-DSCH are different.

The basic structure of HS-DSCH is assumed to be based on two architectures: an RNC-based architecture consistent with Release '99 architecture and a Node B-based architecture for scheduling. Moving the scheduling to the Node B enables a more efficient implementation of scheduling by allowing the scheduler to work with the most recent channel information. The scheduler can adapt the modulation to better match the current channel conditions and fading environment. Moreover, the scheduler can exploit the multi-user diversity by scheduling only those users in constructive fades. Furthermore, the HSDPA proposal has the additional potential to improve on the RNC-based HARQ architecture in both UE memory requirements and transmission delay. The scheduler for the HS-DSCH is therefore located in the Node B, wherein the HS-DSCH refers to the transport channel, which locates between MAC-hs and L1 internally in Node B.

There is no identification IE in Iub/Iur FP (FP, Frame Protocol) to identify a certain UE. Therefore the dedicated transport bearers were needed to identify a particular UE to enable the efficient usage of power control function over the radio interface. This means that number of required transport bearers to be reserved between SRNC and Node B is the same as the number of DSCH data streams. One UE can have several data streams. To make the system work properly, capacity i.e. bandwidth for each transport bearer has to be reserved according the reserved DSCH capacity over the radio interface. E.g. if the DSCH capacity in the radio interface is 512 kbps and there are 10 data streams sharing the channel the maximum required transport capacity is 10 times 512 kbps over Iub interface to ensure the QoS. And as the scheduling is done by MAC-sh in CRNC only one transport bearer is used in certain time frame. As a result a lot of bandwidth is wasted. This increases the need of the bandwidth resources.

The invention is characterised by what is disclosed in the independent claims.

SUMMARY OF THE INVENTION

This invention concerns a method for multiplexing a data stream onto one transport bearer between an originating network node and a receiving network node in a telecommunications network. This is done in order to ensure the effective usage of transport resources over the two interfaces, i.e. Iub/Iur. To accomplish this the RNC and/or Node B/RNC should check if the there already exists a transport bearer, which can be utilised for HS-DSCH data stream over Iub/Iur interface. Because of this a transport bearer identification code or transport bearer id is needed to identify this bearer between RNC and Node B/RNC.

The scheduling to the radio interface for DSCH is done by MAC-sh function located in CRNC whereas in the HS-DSCH the scheduling, wherein the HS-DSCH refers to the transport channel, which locates between MAC-hs and L1 internally in Node, B, to the radio interface shall be done by MAC-hs, which is located in Node B. Therefore the identification of the transport bearer can be done by other means than using dedicated transport bearers between SRNC/CRNC and Node B. Enabling the multiplexing of HS-DSCH data streams to the same transport bearer the huge amount of transport resources can be saved.

Before sending any message to Node B/RNC to request a new transport bearer for HS-DSCH data stream RNC checks if there already exists a transport bearer between RNC and Node B/RNC, which can be used for this purpose. If there does not exist any transport bearer, identified by transport bearer id, that can be used to carry a new HS-DSCH data stream, RNC sends the request for a transport bearer for HS-DSCH data stream without transport bearer id to indicate to Node B/RNC that a new transport bearer is needed.

If the transport bearer that can be used exists, RNC includes the transport bearer id to the request message to indicate to Node B/RNC which existing transport bearer it likes to use for this new HS-DSCH data stream. If Node B/RNC accepts the request, no additional transport layer information shall be included to the response message. Otherwise Node B/RNC includes a new transport layer information to the reply message to indicate that the new transport bearer is needed.

There is also another possibility for Node B/RNC to decide the usage of the transport bearer. In this case RNC will send the HS-DSCH request/modification message to Node B/RNC without any further information. Then receiving Node B/RNC will decide whether it is to assign a new transport bearer or to use existing transport bearer. In case it decides to assign a new transport bearer, it will reply with new transport address and new transport bearer id. If it decides to use existing transport bearer it will reply with only the existing transport bearer id selected to be used as a shared transport bearer for the new HS-DSCH data stream by Node B/RNC, without new transport address.

In the present specification there is no Id that can be used as a transport bearer id to identify on the Radio Network Layer a certain already existing transport bearer out of a particular UE context between RNC and Node B. It is impossible to indicate to Node B/RNC by RNC that one of the existing transport bearers can be used to carry another data stream for different or for the same UE.

To enable the transport bearer selection functionality for HS-DSCH a new transport bearer id shall be introduced between RNC and Node B/RNC in NBAP/RNSAP messages.

When a new transport bearer service instance is created, a transport bearer id is assigned to it by the RNL application. This transport bearer id needs to be unique at least per an interface, i.e. between the two UTRAN nodes terminating the corresponding RNL application protocol. The transport bearer ID is stored by both originating and receiving nodes (RNC, RNC/Node B) for the lifetime of the corresponding transport bearer service instance.

To ensure the uniqueness of the transport bearer id it could be allocated by either end point of the connection or it could be a combination so that each end allocates a certain part of the identifier:

In the present invention it is also assumed that the multiplexing of HS-DSCH data streams are provided above transport layer i.e. in FP/MAC layer.

The benefits of the invention can be summarised as follows: the available transport capacity (i.e., bandwidth) is better utilised due to the improved statistical sharing of the bandwidth. The number of transport bearers, e.g. AAL2 (ATM Adaptation Layer 2) connection is reduced as one bearer can be shared by several user streams. The frequency of transport bearer setups and tear-downs is significantly decreased as there is no need to have a dedicated bearer for each user stream.

BRIEF DESCRIPTION OF THE DRAWINGS

The accompanying drawings, which are included to provide a further understanding of the invention and constitute a part of this specification, illustrate embodiments of the invention and together with the description help to explain the principles of the invention. In the drawings.

DETAILED DESCRIPTION OF THE INVENTION

Reference will now be made in detail to the embodiments of the present invention, examples of which are illustrated in the accompanying drawings.

Figure 4A:
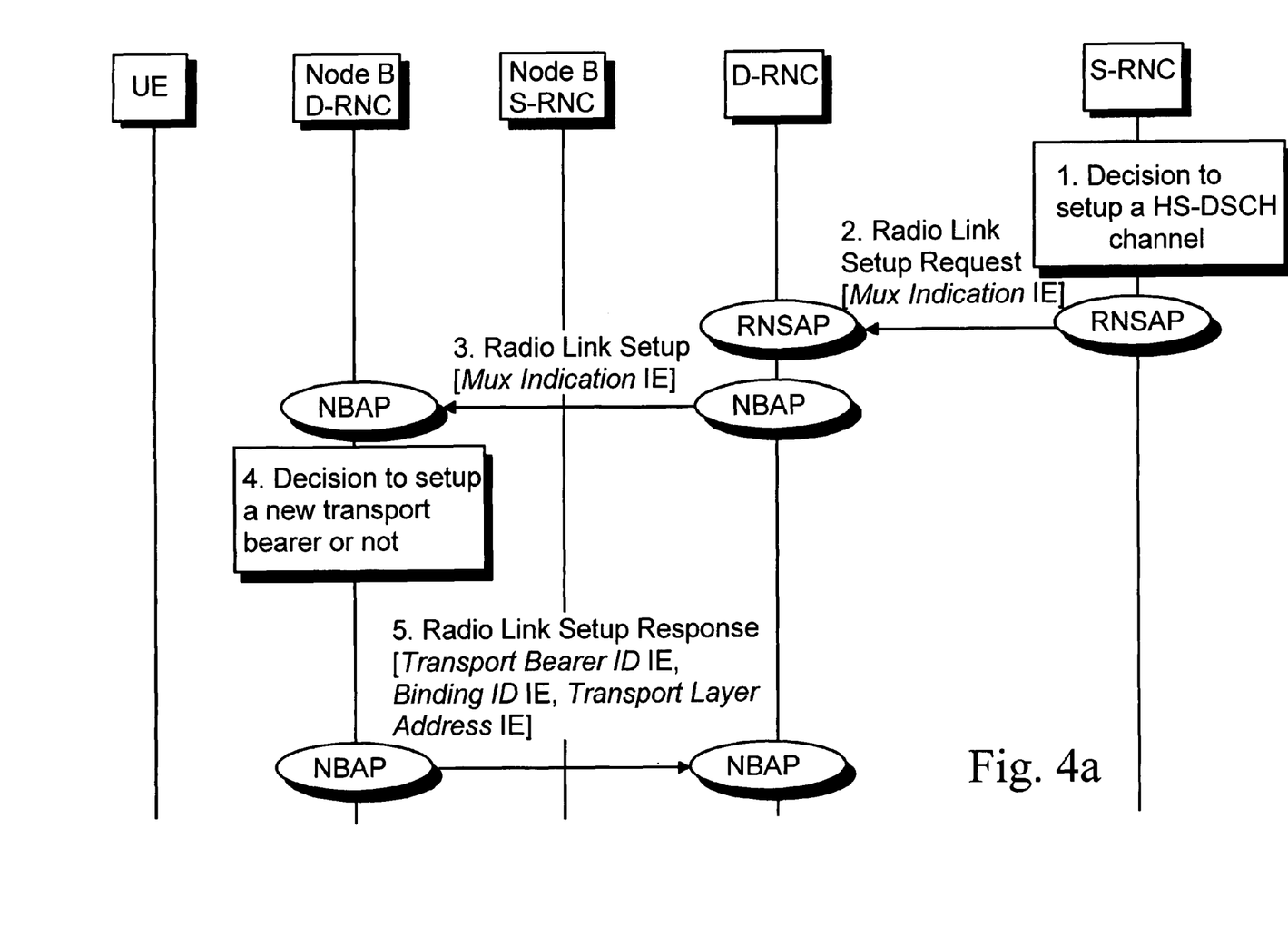
FIG. 4 is a signalling chart describing one embodiment of the present invention.
Figure 4B:
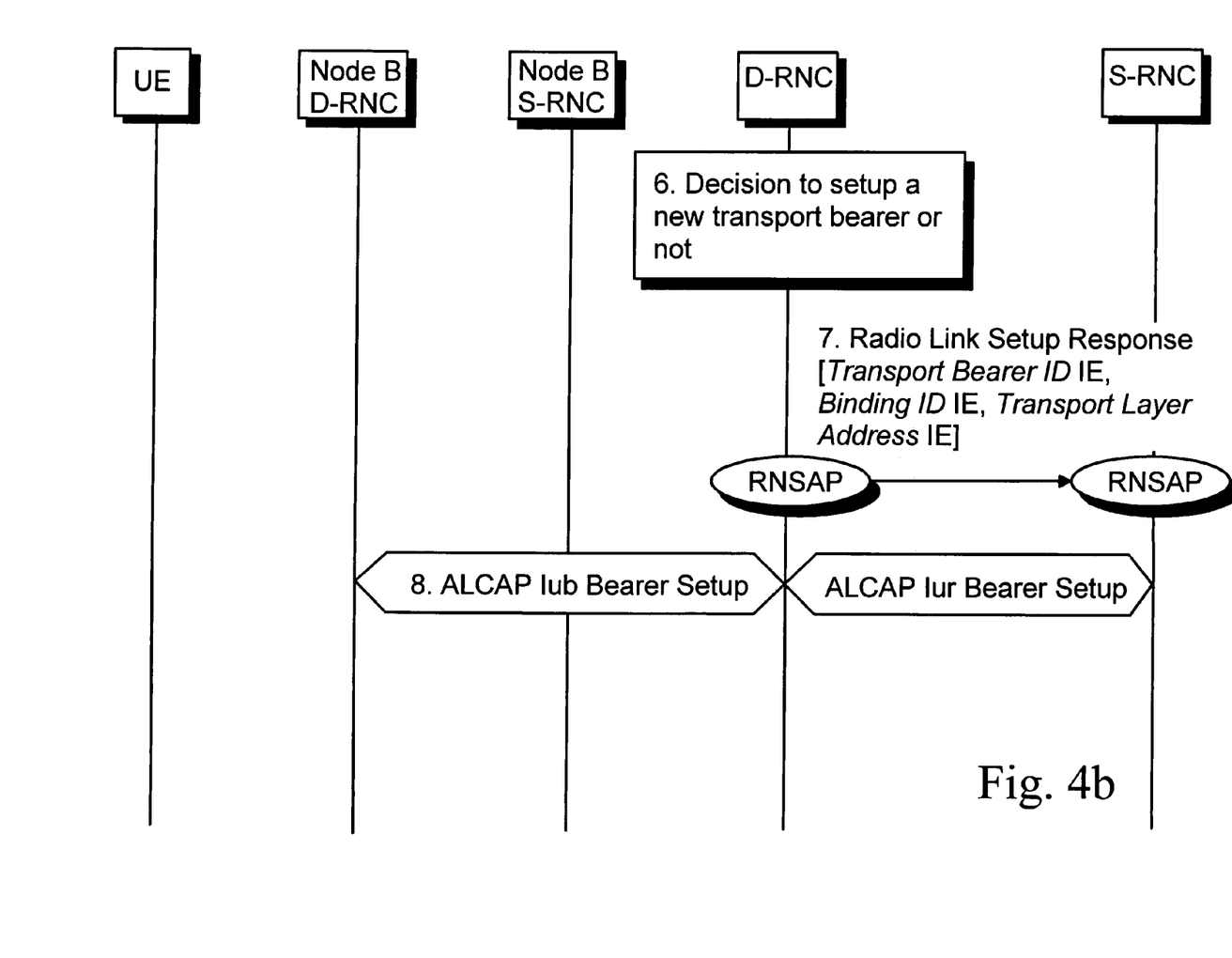
Figure 5A:
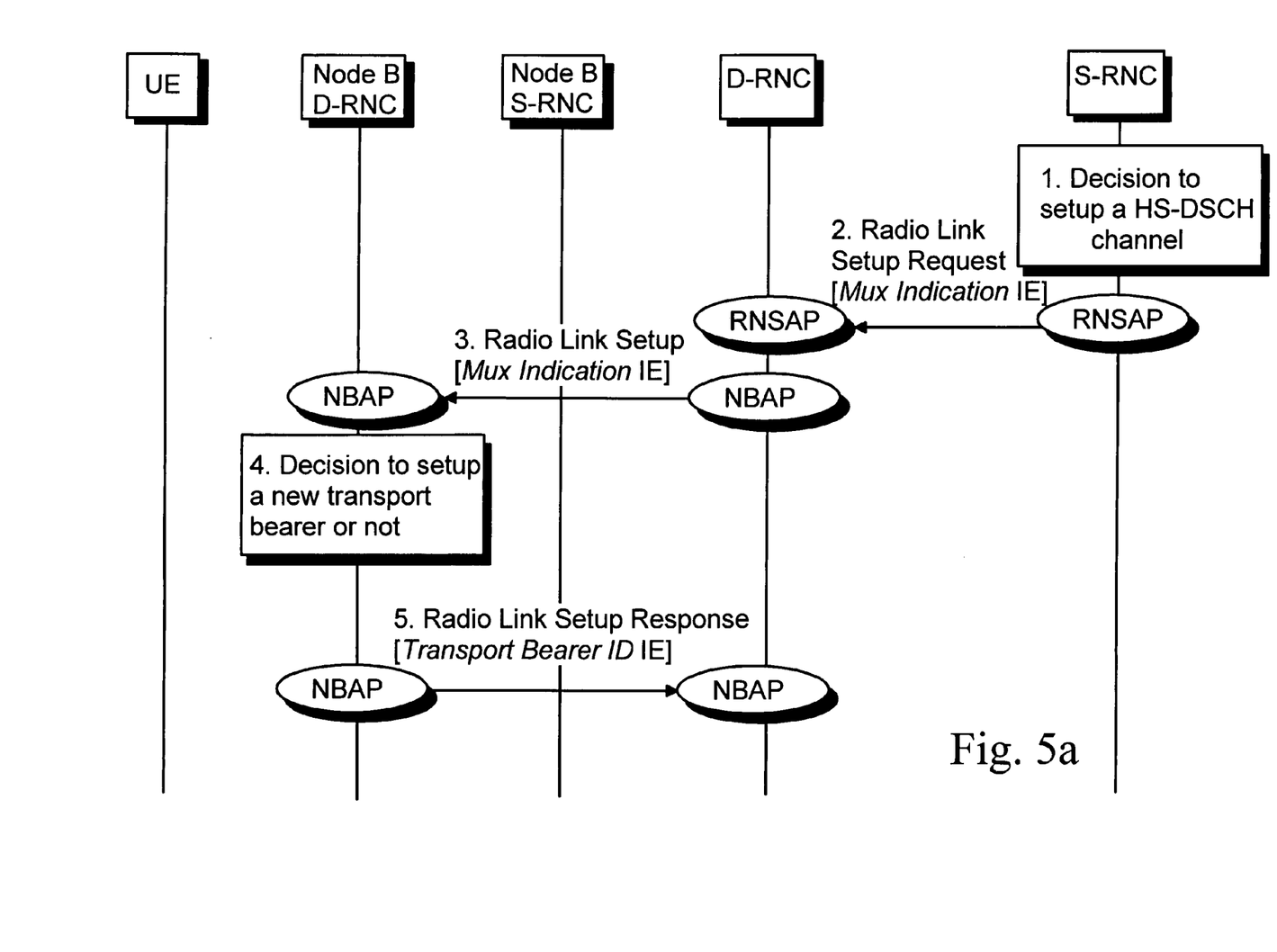
FIG. 5 is a signalling chart describing another embodiment of the present invention.
Figure 5B:
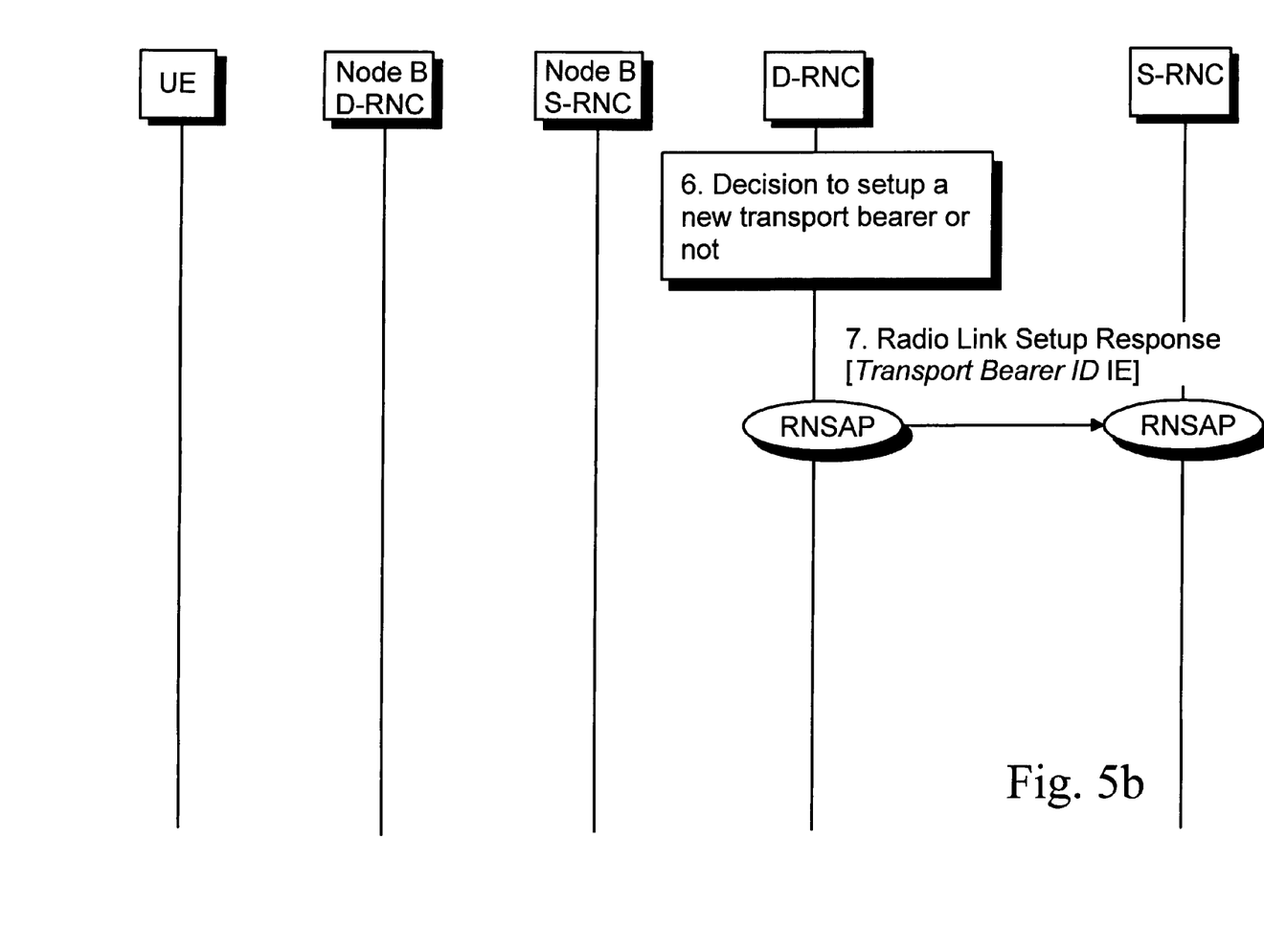

In FIGS. 4 and 5 is disclosed five network elements. Two of these elements are named twice, i.e. Node B/DRNC and Node B/SRNC. This naming is done because these two figures are describing only two examples of the present invention and these same elements could represent also the other element in the labelling.

In FIG. 4 is disclosed a signalling chart describing an example case wherein Node B decides not to use an existing transport bearer resource. In FIG. 4 Serving Radio Network Controller SRNC decides to setup a HS-DSCH channel, item 1. After this decision it sends a Radio Network Subsystem Application Part (RNSAP,) message requesting Radio Link Setup, item 2. The parameter in this message is [Mux Indication IE]. This Mux Indication IE can have the following values: "may" or "shall not" in the request message. In case of "may", receiver can decide whether it will multiplex or not.

But in case of "shall not" receiver cannot use multiplex option. The message is sent to Drift Radio Network Controller DRNC.

After this Drift Radio Network Controller DRNC sends a Node B Application Part message (NBAP) requesting Radio Link Setup to Node B, item 3. The parameter also in this message is [Mux Indication IE]. Node B then checks if there is available transport bearer for a new Radio Link, item 4. In this case it detects that there exists no suitable transport bearer and a new transport bearer is needed. Then Node B sends a Radio Link Setup Response to DRNC to inform DRNC the parameters of the new transport bearers it has decided to establish. The parameters are [Transport Bearer Id IE, Binding ID IE, Transport Layer Address IE], item 5. Based on the information from Node B, DRNC decides to setup a new transport bearer, item 6 Finally DRNC sends a Radio Link Setup Response with parameters [Transport Bearer Id IE, Binding ID IE, Transport Layer Address IE] to SRNC.

In FIG. 5 is disclosed a signalling chart describing an example case wherein Node B decides to use an existing transport bearer resource. In FIG. 5 Serving Radio Network Controller SRNC decides to setup a HS-DSCH channel, item 1. After this decision it sends a Radio Network Subsystem Application Part (RNSAP,) message requesting Radio Link Setup, item 2. The message is sent to Drift Radio Network Controller DRNC. The parameter in this message is [Mux Indication IE]. This Mux Indication IE can have the following values: "may" or "shall not" in the request message. In case of "may", receiver can decide whether it will multiplex or not. But in case of "shall not" receiver cannot use multiplex option. Drift Radio Network Controller DRNC sends a Node B Application Part message (NBAP) requesting Radio Link Setup to Node B, item 3 . The parameter also in this message is [Mux Indication IE]. Node B then checks if there is available transport bearer for a new Radio Link, item 4. In this case it detects that there exists a suitable transport bearer and no new transport bearer is needed. Then Node B sends a Radio Link Setup Response to DRNC with parameter [Transport Bearer Id IE] informing the existing transport bearer that is to be used for this new data stream, item 5. Based on the information from Node B, DRNC decides not to setup a new transport bearer and instead of that uses an existing transport bearer that has been indicated with transport bearer id, item 6. Finally DRNC sends a Radio Link Setup Response with parameter [Transport Bearer Id IE] to SRNC. This is all what is needed because SRNC will use an existing transport bearer and it already has the necessary parameters for this bearer.

The allocating for the transport bearer identification code or transport bearer id can be done in three ways. An originating RNC allocates the transport bearer id when a new transport bearer for HS-DSCH is needed between RNC and RNC/Node B and includes the transport bearer id to the message requesting HS-DSCH establishment/modification. When receiving node (Node B or DRNC) gets the new transport bearer id it stores it (with other transport layer related information) and returns the transport bearer id back to the originating node with allocated transport layer information.

When receiving Node B/RNC gets a Radio Link Setup Request for a HS-DSCH channel from RNC without the transport bearer id, it allocates the id and includes it with the transport layer information to reply message and stores the transport bearer id with correct transport layer information.

In the third option both originating and receiving network node allocates a part of the transport bearer id. In this case RNC allocates the first part of the transport bearer id when a new transport bearer for HS-DSCH is needed between RNC and RNC/Node B and includes the part of the transport bearer id to the message requesting HS-DSCH establishment/modification. After receiving the first part of the transport bearer id the receiving node allocates the other part of the id and stores the whole transport bearer id (with other transport layer related information) and returns the transport bearer id back to originating node with allocated transport layer information.

The transport bearer id is stored in both nodes as long as the transport bearer it identifies exists.

It is obvious to a person skilled in the art that with the advancement of technology, the basic idea of the invention may be implemented in various ways and in various network environments The invention and its embodiments are thus not limited to the examples described above, instead they may vary within the scope of the claims.

The invention claimed is:

1. A method for determining a transport bearer for sending a data stream between a first network node and a second network node in a telecommunications network, the method comprising:

at a first network node, receiving a first message from a second network node, the first message indicating a request for a radio link setup of a radio link, wherein the first network node is a base station configured to communicate with a user equipment and the second network node is a radio network controller;

at the first network node, determining if a transport bearer of a plurality of existing transport bearers is available for the requested radio link;

if a transport bearer of a plurality of existing transport bearers is available for the requested radio link, sending a second message from the first network node to the second network node, the second message including an identifier of the transport bearer; and if a transport bearer of a plurality of existing transport bearers is not available for the requested radio link setup, establishing a new transport bearer and sending a third message from the first network node to the second network node, the third message including a transport address of the new transport bearer.

2. The method of claim 1, wherein the first network node and the second network node are nodes of a universal mobile telecommunication system terrestrial radio access network.

3. The method of claim 2, wherein the first message is received using an Iub interface.

4. The method of claim 1, wherein the first message includes an information element indicating a multiplex option.

5. The method of claim 4, wherein multiplexing is provided above the transport layer.

6. The method of claim 4, wherein the multiplex option indicates that the first network node determines if the radio link is multiplexed.

7. The method of claim 4, wherein the multiplex option indicates that the radio link cannot be multiplexed.

8. The method of claim 1, further comprising assigning a second identifier to the new transport bearer, wherein the third message further includes the second identifier of the new transport bearer.

9. The method of claim 8, wherein the second identifier is unique between the first network node and the second network node.

10. The method of claim 8, further comprising storing the second identifier at the first network node.

11. The method of claim 8, further comprising receiving a fourth message at the first network node from the second network node, the fourth message including a third identifier of the new transport bearer, wherein the identifier of the new transport bearer includes the second identifier and the third identifier.

12. The method of claim 1, wherein the third message further includes a binding identifier.

13. A method for determining a transport bearer for sending a data stream between a first network node and a second network node in a telecommunications network, the method comprising:
   at a first network node, determining if a transport bearer of a plurality of existing transport bearers is available for a radio link;
   if a transport bearer of a plurality of existing transport bearers is not available for the requested radio link setup, sending a first message from the first network node to a second network node, the first message indicating a request for a radio link setup and receiving a second message from the second network node at the first network node, the second message including a transport address of a new transport bearer; and
   if a transport bearer of a plurality of existing transport bearers is available for the requested radio link, sending a third message from the first network node to the second network node, the third message including the identifier of the transport bearer available for the requested radio link, wherein the first network node is a radio network controller and the second network node is a base station configured to communicate with a user equipment.

14. The method of claim 13, wherein the first message includes an information element indicating a multiplex option.

15. The method of claim 14, wherein the multiplex option indicates that the second network node determines if the radio link is multiplexed.

16. The method of claim 14, wherein the multiplex option indicates that the radio link cannot be multiplexed.

17. The method of claim 13, further comprising assigning a second identifier to the new transport bearer wherein the first message includes the second identifier of the new transport bearer.

18. The method of claim 17, wherein the second identifier is unique between the first network node and the second network node.

19. The method of claim 17, further comprising storing the second identifier at the first network node.

20. The method of claim 13, wherein the second message further includes a binding identifier.

21. The method of claim 13, wherein the second message further includes a second identifier of the new transport bearer.

22. The method of claim 21, further comprising assigning a third identifier to the new transport bearer, wherein the identifier of the new transport bearer includes the second identifier and the third identifier.

23. The method of claim 22, further comprising sending a fourth message from the first network node to the second network node, the fourth message including the identifier of the new transport bearer.

24. The method of claim 13, wherein the first message does not include a transport bearer identifier to indicate a new transport bearer is needed.

25. The method of claim 13, wherein the first network node and the second network node are nodes of a universal mobile telecommunication system terrestrial radio access network.

26. The method of claim 25, wherein the first message is sent using an Iub interface.

27. The method of claim 13, further comprising, at the first network node, before determining if a transport bearer of a plurality of existing transport bearers is available, receiving a fourth message from a third network node, the fourth message indicating a first request for the radio link setup of the radio link.

28. The method of claim 27, wherein the fourth message is sent using an Iur interface.

29. The method of claim 28, wherein the third network node is a second radio network controller of the universal mobile telecommunication system terrestrial radio access network.

30. The method of claim 13, further comprising sending a fourth message from the first network node to a third network node, the fourth message including the transport address of the new transport bearer.

31. The method of claim 13, further comprising sending a fourth message from the first network node to a third network node, the fourth message including the identifier of the transport bearer available for the requested radio link.

32. A base station device configured to communicate with a user equipment and a network node, wherein the network node is a radio network controller, the device comprising:
   a radio interface configured to receive a first message from the network node, the first message indicating a request for a radio link setup of a radio link;
   to determine if a transport bearer of a plurality of existing transport bearers is available for the requested radio link;
   to send a second message to the network node if a transport bearer of a plurality of existing transport bearers is available for the requested radio link, the second message including an identifier of the transport bearer; and
   to establish a new transport bearer and to send a third message to the network node if a transport bearer of a plurality of existing transport bearers is not available for the requested radio link setup, the third message including a transport address of the new transport bearer.

33. The device of claim 32, wherein the first message is received using an Iub interface.

34. The device of claim 32, wherein the radio interface is further configured to assign a second identifier to the new transport bearer, wherein the third message further includes the second identifier of the new transport bearer.

35. The device of claim 32, wherein the radio interface is further configured to receive a fourth message from the network node, the fourth message including a third identifier of the new transport bearer, wherein the identifier of the new transport bearer includes the second identifier and the third identifier.

36. A radio network controller device configured to communicate with a network node, wherein the network node is a base station, the device comprising:
   a radio interface configured to determine if a transport bearer of a plurality of existing transport bearers is available for a radio link;
   the radio interface further configured to send a first message to the network node and to receive a second message from the network node if a transport bearer of a plurality of existing transport bearers is not available for the requested radio link setup, the first message indicating a request for a radio link setup and the second message including a transport address of a new transport bearer; and
   the radio interface further configured to send a third message to the network node if a transport bearer of a plurality of existing transport bearers is available for the requested radio link setup, the third message including the identifier of the transport bearer available for the requested radio link.

37. The device of claim 36, wherein the radio interface is further configured to assign a second identifier to the new transport bearer wherein the first message includes the second identifier of the new transport bearer.

38. The device of claim 36, wherein the second message further includes a second identifier of the new transport bearer.

39. The device of claim 38, wherein the radio interface is further configured to assign a third identifier to the new transport bearer, wherein the identifier of the new transport bearer includes the second identifier and the third identifier.

40. The device of claim 39, wherein the radio interface is further configured to send a fourth message to the network node, the fourth message including the identifier of the new transport bearer.

41. The device of claim 36, wherein the first message does not include a transport bearer identifier to indicate a new transport bearer is needed.

42. The device of claim 36, wherein the first message is sent using an Tub interface.

43. The device of claim 36, wherein the radio interface is further configured to receive a fourth message from a second network node before determining if a transport bearer of a plurality of existing transport bearers is available, the fourth message indicating a first request for the radio link setup of the radio link.

44. The device of claim 43, wherein the fourth message is sent using an Iur interface.

45. The device of claim 36, wherein the radio interface is further configured to send a fourth message to a second network node, the fourth message including the transport address of the new transport bearer.

46. The device of claim 36, wherein the radio interface is further configured to send a fourth message to a second network node, the fourth message including the identifier of the transport bearer available for the requested radio link.

* * * * *

UNITED STATES PATENT AND TRADEMARK OFFICE
CERTIFICATE OF CORRECTION

| | | |
|---|---|---|
| PATENT NO. | : 7,869,414 B2 | Page 1 of 1 |
| APPLICATION NO. | : 10/849892 | |
| DATED | : January 11, 2011 | |
| INVENTOR(S) | : Isokangas et al. | |

It is certified that error appears in the above-identified patent and that said Letters Patent is hereby corrected as shown below:

Column 10, line 2, in Claim 42, delete "Tub" and insert -- Iub --.

Signed and Sealed this

Seventeenth Day of May, 2011

David J. Kappos
*Director of the United States Patent and Trademark Office*